(12) United States Patent
Bartolo

(10) Patent No.: US 10,309,279 B2
(45) Date of Patent: Jun. 4, 2019

(54) EXHAUST GAS PURIFICATION DEVICE AND CORRESPONDING CONTROL PROCESS

(71) Applicant: Faurecia Systemes D'echappement, Nanterre (FR)

(72) Inventor: Xavier Bartolo, Étouvans (FR)

(73) Assignee: Faurecia Systemes D'echappement (FR)

( * ) Notice: Subject to any disclaimer, the term of this patent is extended or adjusted under 35 U.S.C. 154(b) by 0 days.

(21) Appl. No.: 15/944,977

(22) Filed: Apr. 4, 2018

(65) Prior Publication Data

US 2018/0291787 A1    Oct. 11, 2018

(30) Foreign Application Priority Data

Apr. 7, 2017    (FR) ...................... 17 53059

(51) Int. Cl.
*F01N 3/20*    (2006.01)
*H05B 3/03*    (2006.01)
(Continued)

(52) U.S. Cl.
CPC ......... *F01N 3/2013* (2013.01); *F01N 3/2882* (2013.01); *H05B 3/03* (2013.01); *H05B 3/24* (2013.01); *B01D 53/944* (2013.01); *B01D 53/9418* (2013.01); *B01D 53/9422* (2013.01); *B01D 53/9445* (2013.01); *F01N 3/0814* (2013.01); *F01N 3/0842* (2013.01); *F01N 3/101* (2013.01); *F01N 3/103* (2013.01); (Continued)

(58) Field of Classification Search
CPC ............. F01N 2240/16; B01D 53/9422; B01F 5/0694; H05B 2203/022

USPC ........................................................ 422/174
See application file for complete search history.

(56) References Cited

U.S. PATENT DOCUMENTS 5,053,603 A  * 10/1991  Wagner ................... F01N 3/027
                                                            219/205
2003/0003031 A1    1/2003  Bruck et al.
2011/0023461 A1*   2/2011  Strots .................... F01N 3/2066
                                                             60/286

FOREIGN PATENT DOCUMENTS

DE    102005063081 A1    7/2007
DE    102010052003 A1    5/2012

OTHER PUBLICATIONS

Search Report for French Application No. 1753059 dated Jan. 31, 2018.

* cited by examiner

*Primary Examiner* — Tom P Duong
(74) *Attorney, Agent, or Firm* — Carlson, Gaskey & Olds, P.C.

(57) ABSTRACT

A device includes a power source, at least one exhaust gas purification member having an upstream face and a downstream face, and a heating member placed in front of and at a distance from the upstream or downstream face. The heating member comprises a frame and a plurality of elongate heating elements surrounded by a peripheral part of the frame. Each heating element has first and second ends, with at least one of the first and second ends being electrically connected to the power source with the other end being connected to the frame. Each heating element is, between the first and second ends, connected only to at least one other of the heating elements. The heating elements are in contact with one another by respective points of contact, two points of contact of two different heating elements in contact with one another being at the same electric potential.

14 Claims, 12 Drawing Sheets

(51) Int. Cl.
  H05B 3/24     (2006.01)
  F01N 3/28     (2006.01)
  B01D 53/94        (2006.01)
  F01N 3/08         (2006.01)
  F01N 3/10         (2006.01)
(52) U.S. Cl.
  CPC ........ *F01N 3/2066* (2013.01); *F01N 2240/16* (2013.01); *F01N 2530/04* (2013.01); *F01N 2530/06* (2013.01); *H05B 2203/022* (2013.01); *Y02T 10/47* (2013.01)

EXHAUST GAS PURIFICATION DEVICE AND CORRESPONDING CONTROL PROCESS

CROSS-REFERENCE TO RELATED APPLICATION

This application claims priority to FR 1753059, filed Apr. 7, 2017.

FIELD OF INVENTION

The invention generally relates to devices and methods for purifying exhaust gases from a vehicle.

BACKGROUND

The exhaust lines of vehicles equipped with heat engines typically comprise catalytic purification members, for example making it possible to convert NOx, CO and hydrocarbons into $N_2$, $CO_2$ and $H_2O$. Such members are only effective when the catalytic material is at a minimum temperature.

WO2016/066551 describes a purification device in which a heating member is mounted across from the upstream face of a catalyst. The heating member comprises a heating wire, fixed by pins pushed into the channels of the catalyst.

Such fastening is delicate to do at a fast pace.

Furthermore, such a system restricts the choice of the catalyst to be integrated (type of substrate, impregnation, etc.).

In this context, a device is proposed for purifying vehicle exhaust gases that is easier to manufacture and allows efficient heating.

SUMMARY OF INVENTION

According to a first aspect, a device for purifying exhaust gases from a vehicle, comprises:
  at least one exhaust gas purification member having an upstream face by which the exhaust gases penetrate the purification member and a downstream face by which the exhaust gases leave the purification member;
  a power source;
  a heating member placed in front of and at a distance from the upstream face or the downstream face, the heating member comprising a frame and a plurality of elongate heating elements forming at least one heating layer permeable to the exhaust gases, the frame comprising a peripheral part surrounding the elongate heating elements and having a geometric center, each elongate heating element having first and second ends opposite one another, at least one of the first and second ends being electrically connected to a terminal of the power source; at least one of the first and second ends being connected to the frame, and each elongate heating element being, between the first and second ends, connected only to at least one other of the elongate heating elements.

Thus, the elongate heating elements have small sections, and are mechanically completely independent from the purification member. The heating member can be mounted independently of the purification member, which makes the assembly more flexible and more convenient. Only the frame must be fastened.

The elongate heating elements typically have small sections, each elongate heating element having a straight section preferably smaller than 20 $mm^2$, more preferably comprised between 0.002 $mm^2$ and 10 $mm^2$.

The use of elongate heating elements with small sections makes it possible to increase the length of these elements. They can therefore be arranged on one or several planes and well distributed across from the purification member, so as to heat the upstream face or the downstream face of the purification member uniformly.

Distributing the linear heating elements if applicable in several planes and attaching them to one another makes it possible to obtain a rigid enough structure.

Using linear heating elements with small sections further offers the advantage of reducing the thermal inertia of the heating member and accelerating the temperature increase of the heating member.

The purification device may also have one or more of the features below, considered individually or according to all technically possible combinations.
  the elongate heating elements are arranged in a pattern that repeats circumferentially around the geometric center;
  the elongate heating elements are in contact with one another by respective points of contact, two points of contact of two different elongate heating elements in contact with one another being at the same electric potential;
  all of the points of contact are arranged on a plurality of isopotential lines, with a closed contour, substantially centered on the geometric center, all of the points of contact at the same electrical potential being placed on a same isopotential line;
  two points of contact of two different elongate heating elements in contact with one another are situated, along the elongate heating elements, at the same distance from the first respective ends of the two linear heating elements;
  each elongate heating element occupies a respective angular sector around the geometric center, the angular sectors being adjacent to one another;
  each elongate heating element is arranged in a zigzag and alternately forms first and second segments connected by elbows, the first segments extending radially from the peripheral part toward the geometric center and circumferentially around the geometric center along a first direction, the second segments extending radially from the peripheral part toward the geometric center and circumferentially around the geometric center along a second direction opposite the first direction;
  at least some of the elongate heating elements each form a first arc from the peripheral part toward the geometric center, the first arc being concave on a first circumferential side, at least some of the elongate heating elements each forming a second arc toward the geometric center, the second arc being concave on a second circumferential side opposite the first circumferential side, the first arcs intersecting the second arcs at the intersection point and being fastened to the second arcs at the intersection points;
  the elongate heating elements are wires or strips assembled to one another by any appropriate method, or strips integral with one another;
  the frame further includes a central support placed at the center of the frame and mechanically connected to the peripheral part, each elongate heating element being mechanically connected by the first end to the peripheral part and by the second end to the central support;

the peripheral part includes a first electric distributor and the central support includes a second electric distributor, each elongate heating element being electrically connected by the first end to the first electric distributor and by the second end to the second electric distributor;

the purification device comprises at least first and second layers of elongate heating elements, each elongate heating element being rigidly fastened by the first end to the peripheral part, the elongate heating elements of the first layer and the elongate heating elements of the second layer being electrically connected to one another by their respective second ends, the second ends being situated in a central zone of the frame;

the frame does not include a central support mechanically connected to the peripheral part;

the peripheral part of the frame comprises a first electric distributor extending around the elongate heating elements, and a second electric distributor extending around the elongate heating elements, the elongate heating elements of the first layer being electrically connected by their respective first ends to the first electric distributor, the elongate heating elements of the second layer being electrically connected by their respective first ends to the second electric distributor;

the first and second electric distributors are positioned side by side along a central axis of the frame, or concentrically, and are electrically isolated from one another;

the central support and/or the electric distributor is/are integral with the elongate heating elements;

the first electric distributor and/or the second electric distributor is/are integral with the elongate heating elements;

the purification device comprises an enclosure inside which the exhaust gas purification member is placed, the enclosure constituting an electric distributor to which the first or second ends of the elongate heating elements are electrically connected.

the frame inwardly delimits a passage area for the exhaust gases, the elongate heating elements being positioned in the passage area;

the elongate heating elements are made from a material chosen from among FeCrAl, NiCr and its alloys, stainless steel, inconel or silicon carbide;

the purification device comprises another purification member having another upstream face by which the exhaust gases penetrate the other purification member and another downstream face by which the exhaust gases leave the other purification member, the heating member being placed between the downstream face of the purification member and the other upstream face so as to heat both the downstream face and the other upstream face by thermal radiation;

the elongate heating elements have no electrically insulating coating.

According to a second aspect, the invention relates to a method for controlling a device having the above features, the method comprising the following steps:

acquiring an intensity of electric current powering the heating member and an electric voltage across terminals of the heating member; and determining a temperature of the elongate heating elements by using the acquired current intensity and voltage.

According to a third aspect, the invention relates to a method for controlling a device having the above features, the method comprising the following steps:

supplying electricity to the heating member;

acquiring an intensity of electric current powering the heating member and an electric voltage across terminals of the heating member, when the heating member is at a known predetermined temperature;

evaluating a resistance of the elongate heating elements by using the acquired current intensity and voltage; and detecting any damage of the elongate heating elements by using the evaluated resistance.

According to a fourth aspect, the invention relates to a method for controlling a device having the above features, the method comprising the following steps:

supplying electricity to the heating member;

acquiring an intensity of electric current powering the heating member and an electric voltage across terminals of the heating member, under conditions where the heating member generates a negligible quantity of heat; and determining a temperature of the exhaust gases by using the acquired current intensity and voltage.

According to a fifth aspect, the invention relates to a method for controlling a device having the above features, the method comprising the following steps:

supplying electricity to the heating member;

acquiring an intensity of electric current powering the heating member and an electric voltage across terminals of the heating member;

determining a temperature of the elongate heating elements by using the acquired current intensity and voltage;

determining a theoretical temperature of the elongate heating elements without circulation of the exhaust gases; and determining an exhaust gas flow rate using the temperature of the elongate heating elements previously determined and the theoretical temperature of the elongate heating elements previously determined.

According to a sixth aspect, the invention relates to an exhaust line comprising a purification device having the above features.

BRIEF DESCRIPTION OF THE DRAWINGS

Other features and advantages of the invention will emerge from the detailed description thereof provided below, for information and non-limitingly, in reference to the appended figures, in which.

DETAILED DESCRIPTION

Figure 1:
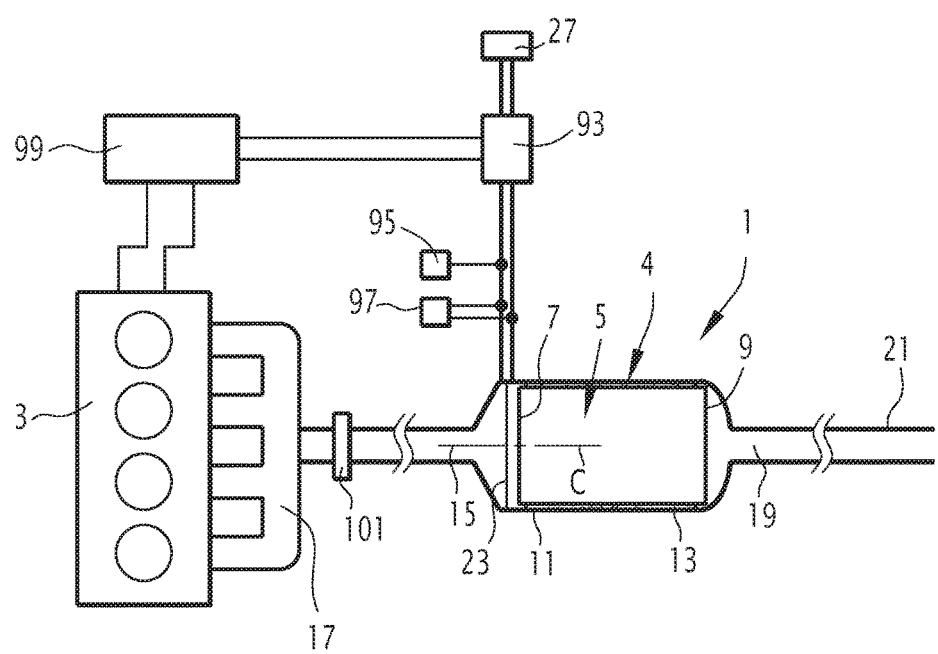
FIG. 1 is a simplified schematic illustration of an exhaust line according to the invention.

The exhaust line 1 shown in FIG. 1 is intended to be installed on board a vehicle, typically a vehicle equipped with a heat engine 3. This vehicle is typically a motor vehicle, for example a car or truck.

As shown in FIG. 1, the exhaust line 1 comprises an exhaust gas purification device 4. This device 4 includes at least one purification member 5 for purifying exhaust gases having an upstream face 7 by which the exhaust gases penetrate the purification member 5, and a downstream face 9 by which the exhaust gases leave the purification member 5.

In the present description, upstream and downstream will be understood relative to the normal direction of the exhaust gases.

The purification member 5 is for example an SCR catalyst, a three-way catalyst, an oxidation catalyst, or an NOx trap.

The purification member 5 is placed inside an enclosure 11, with an interposed maintaining layer 13. The enclosure 11 has an exhaust gas inlet 15, fluidly connected to a collector 17 capturing the exhaust gases leaving the combustion chambers of a heat engine 3.

The enclosure 11 also has an outlet 19, fluidly connected to a cannula 21 making it possible to release the purified exhaust gases into the atmosphere.

The purification device 4 further comprises a heating member 23 placed across and at a distance from the upstream face 7 of the purification member.

The heating member 23 is placed inside the enclosure 11.

Figure 2:
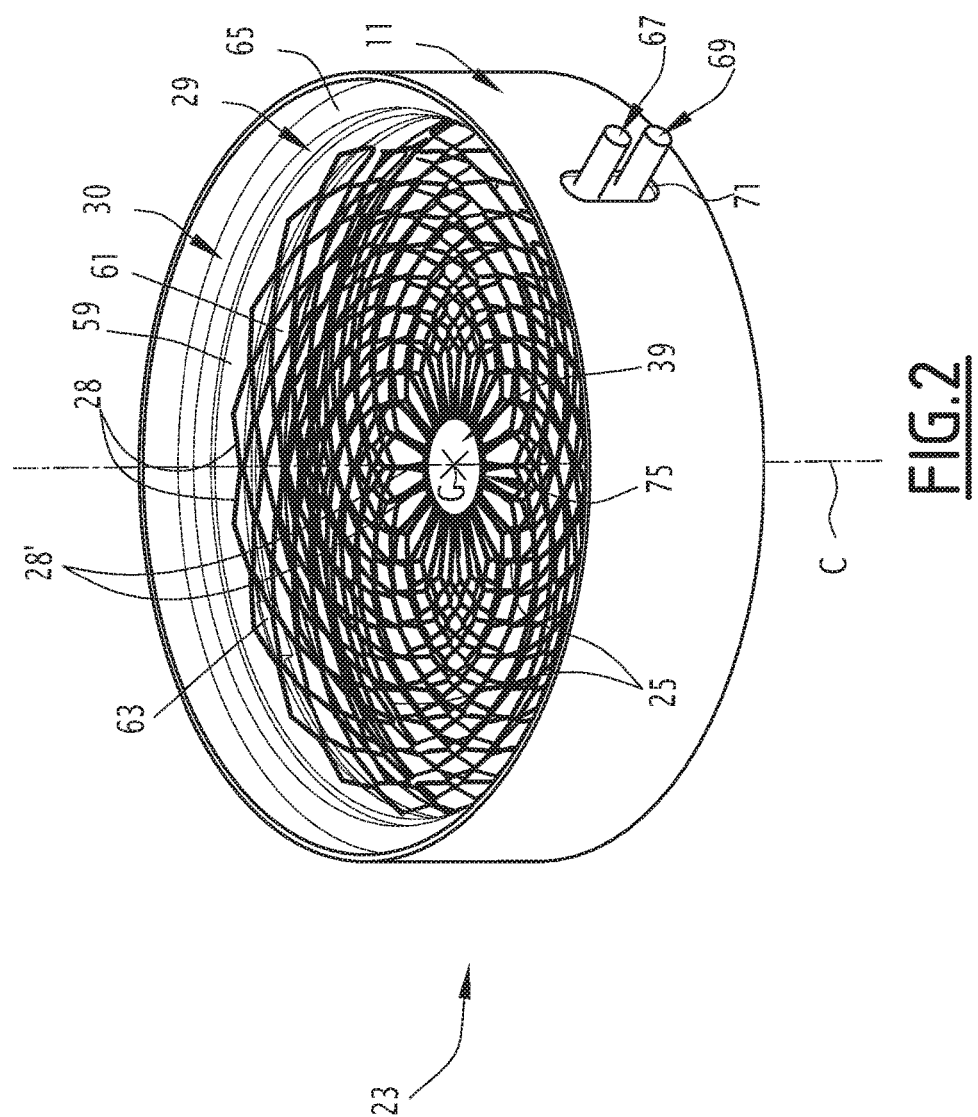
FIG. 2 is a perspective view of the heating member of the purification device of the exhaust line of FIG. 1.
Figure 3:
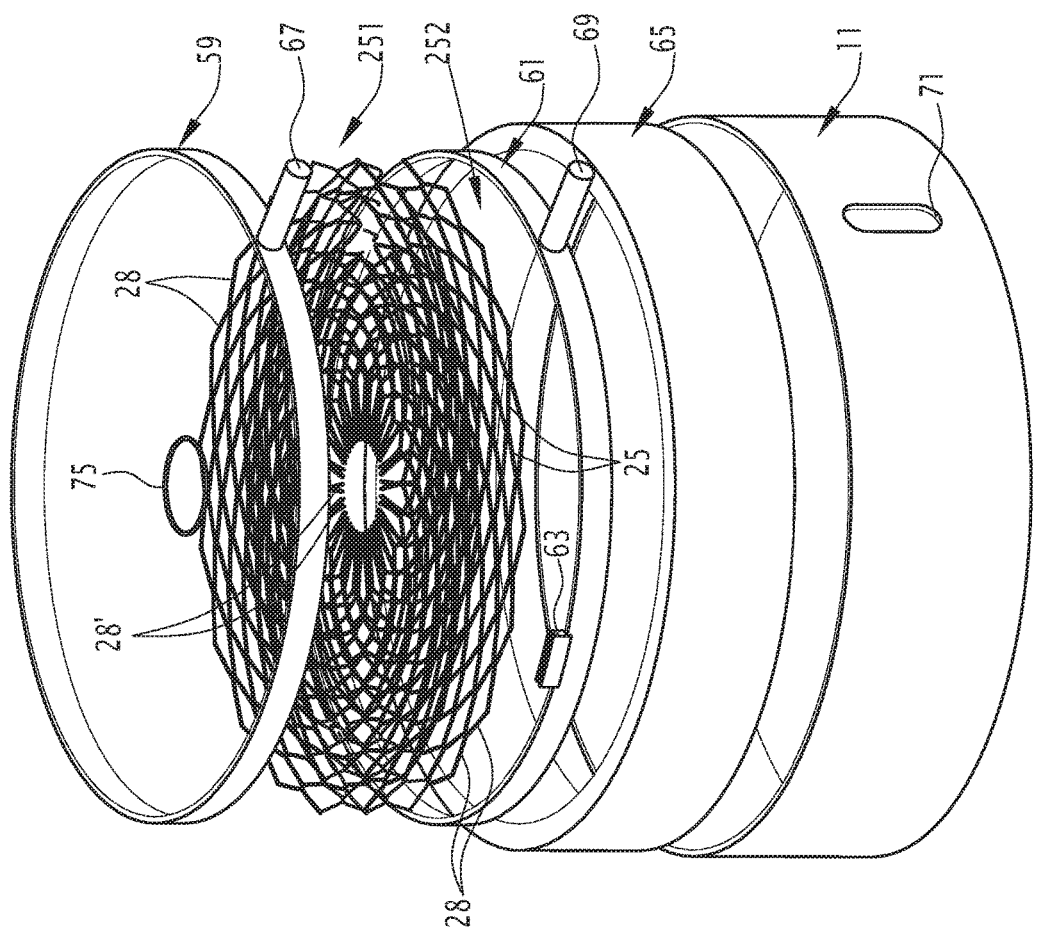
FIG. 3 is an exploded perspective view of the heating member of FIG. 2.

The heating member 23, as in particular illustrated in FIGS. 2 and 3, comprises multiple elongate heating elements 25, forming at least one heating layer permeable to the exhaust gases.

These elongate heating elements 25 are resistive elements.

The purification device 4 further comprises a power source 27 (FIG. 1).

Each elongate heating element 25 has first and second ends 28, 28' opposite one another, at least one of the first and second ends 28, 28' being electrically connected to a terminal of the power source 27.

The power source 27 comprises an electrical energy source, which is for example an electrical battery of the vehicle. Alternatively, it is another energy source.

The electric energy source typically provides a direct or choppy current, under a voltage depending on the vehicle (12, 48 or 400 volts, for example).

The second end 28' is typically electrically connected to the electrical energy source. The first end 28 is, for example, directly electrically connected to the ground, or is combined with the ground, or is electrically connected to another terminal of the power source.

The first and second ends 28, 28' are thus at first and second electrical potentials different from one another.

The elongate heating elements 25 are typically heated to a temperature comprised between 150 and 1300° C., preferably between 200 and 1000° C., so as to transmit the thermal power to the exhaust gases by convection and/or to emit in the infrared domain.

Each elongate heating element has a straight section preferably smaller than 20 mm$^2$, more preferably comprised between 0.002 mm$^2$ and 10 mm$^2$, still more preferably comprised between 0.075 mm$^2$ and 5 mm$^2$, and still more preferably comprised between 0.03 mm$^2$ and 0.2 mm$^2$.

For elements with a circular section, this corresponds to a diameter preferably smaller than 5 mm, more preferably comprised between 0.05 mm and 3.5 mm, still more preferably comprised between 0.1 mm and 2.5 mm, and still more preferably comprised between 0.2 mm and 0.5 mm.

The elongate heating elements 25 are preferably made from a material provided to withstand the above temperatures, and withstand oxidation in the presence of exhaust gas. For example, the elements 25 are made from a material chosen from among FeCrAl, NiCr and its alloys, stainless steel, inconel or silicon carbide. For example, the elements 25 are made from Kanthal® A1, Nichrome® 80 or Nikrothal® 80.

The rated operating temperature of the heating member 23, as well as the total rated radiative thermal power and optionally the rated total convective thermal power of the heating member 23 determine the total outer surface required for the elongate heating elements 25. This surface in turn determines the straight section of each elongate heating element 25, and the total length of the elongate heating elements 25.

The straight section of each elongate heating element 25 is in particular determined taking the characteristics of the power source 27 into account. Indeed, the electrical resistance of each elongate heating element 25 increases with the length of this heating element and decreases with its section. Each elongate heating element 25 thus has, between its first and second ends 28 and 28', a length conditioned by the voltage available on board the vehicle.

For a rated electrical power of 5 kW under 48 volts, the total length of the elongate heating elements 25 is about 7 m for elements with a section of 0.03 mm$^2$. The total length of 7 m is obtained by using 40 elongate heating elements 25, each 17 cm long.

Preferably, the elongate heating elements 25 have no electrically insulating coating.

The heating member 23, in addition to the elongate heating elements 25, comprises a frame 29 having a peripheral part 30 surrounding the elongate heating elements 25. The peripheral part 30 has a geometric center G.

The peripheral part 30 with a closed contour of the frame 29 inwardly delimits a passage for the exhaust gases.

It has any appropriate shape: rectangular, circular, oval, etc. In the illustrated examples, the peripheral part 30 is circular.

Advantageously, at least one of the first and second ends 28, 28' is connected to the frame 29, and each elongate heating element 25 is, between its first and second ends 28, 28', connected only to at least one other of the elongate heating elements 25.

Thus, each elongate heating element 25 is connected only to the frame 29 and at least one other of the elongate heating elements 25.

This means that the elongate heating elements 25 are connected only to the elements making up the heating member 23. They are not connected to the other elements of the exhaust gas purification device 4.

To that end, the elongate heating elements 25 are arranged in a pattern that repeats circumferentially around the geometric center G. Indeed, the heating member 23 is substantially planar. If one considers the axis perpendicular to said plane and passing through the geometric center G, then the pattern drawn by the elongate heating elements 25 repeats with a determined period around the axis. For example, the pattern drawn by the elongate heating elements 25 is considered in an angular sector around the geometric center G. In the example embodiment of FIG. 7, it is for example possible to consider an angular sector of 18°. The pattern drawn by the elongate heating elements 25 is reproduced with a period of 18°. It is therefore reproduced twenty times around the geometric center G.

The axis above will be called central axis C in the following description. It is typically combined with the axis of symmetry of the enclosure 11. It constitutes the central axis of the frame 29.

Furthermore, the elongate heating elements 25 are in contact with one another by respective points of contact 57, two points of contact of two different elongate heating elements 25 in contact with one another being at the same electric potential.

Figure 5:
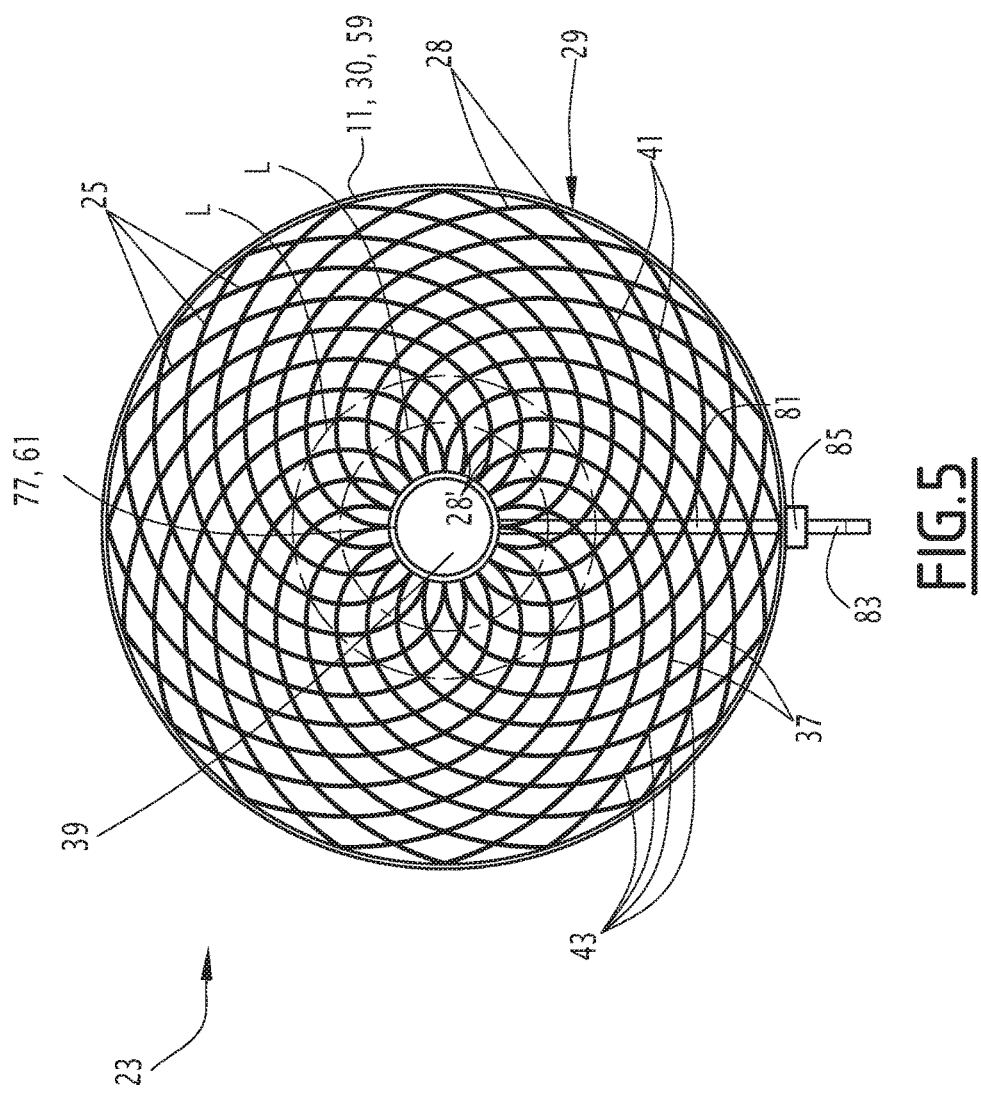
FIG. 5 is a front view of the heating member of FIG. 4.
Figure 7:
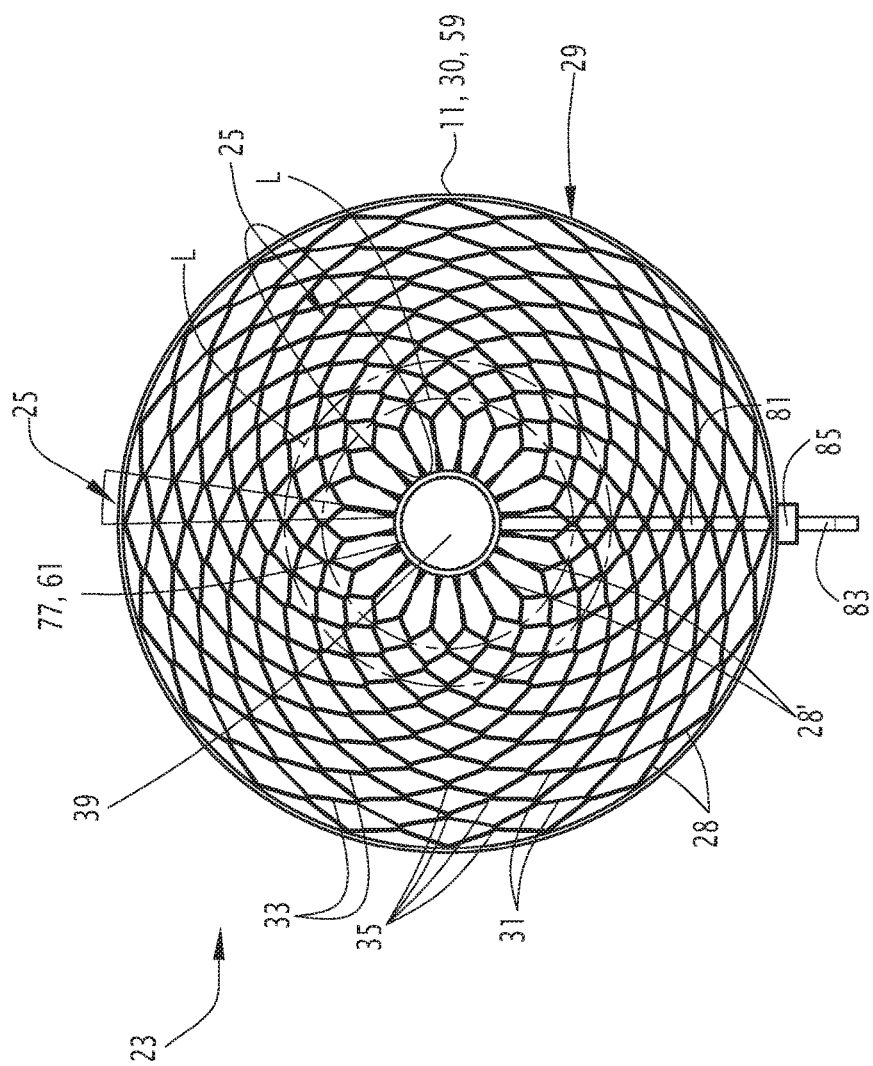

Preferably, all of the points of contact 57 are arranged on a plurality of isopotential lines L, with a closed contour. Some of these lines are shown in FIGS. 5 and 7. The isopotential lines L are substantially centered on the geometric center G.

For example, the isopotential lines L are circles centered on the geometric center G.

All of the points of contact 57 at a same electric potential are placed on a same isopotential line L. It is possible for some isopotential lines L to be combined.

Typically, at least half of the isopotential lines L have a mean diameter increasing when the electric potential decreases, or at least half the isopotential lines L have a diameter decreasing when the electric potential decreases.

When the current is brought in and discharged by the outside, as shown in FIGS. 2 and 3, half of the isopotential lines L have a mean diameter that decreases when the electric potential decreases. The other half of the isopotential lines L has a mean diameter increasing when the electric potential decreases.

When the current is brought in by the center and discharged by the outside, as for example shown in FIGS. 4 to 9, the isopotential lines L have a mean diameter that increases when the electric potential decreases.

When the current is brought in by the outside and discharged by the center (case not shown), the isopotential lines L have a mean diameter that decreases when the electric potential decreases.

To allow such an arrangement, two points of contact 57 of two different elongate heating elements 25, in contact with one another, are situated along said elongate heating elements 25 at the same distance from the first respective ends 28 of said two elongate heating elements 25.

These points of contact 57 are also typically situated at the same distance from the respective second ends 28' of the two elongate heating elements 25.

In this case, it is particularly advantageous for all of the elongate heating elements 25 to have the same length taken between their respective first and second ends 28, 28'.

According to a first embodiment, each elongate heating element 25 occupies a respective angular sector around the geometric center G. The angular sectors occupied by the elongate heating elements 25 are adjacent to one another. This embodiment is shown in FIGS. 2, 3, 6, 7 and 9.

In the first embodiment, each elongate heating element 25 is arranged in a zigzag and alternately forms the first and second segments 31, 33 connected by bends 35 (FIG. 7).

As clearly shown in FIG. 7, the first segments 31 extend radially toward the geometric center G and circumferentially around the geometric center G in a first direction. This first direction is clockwise in the illustration of FIG. 7.

The second segments 33 extend radially toward the geometric center G and circumferentially around the geometric center in a second direction opposite the first direction. In the illustration of FIG. 7, the second direction is counterclockwise.

Two elongate heating elements 25 occupying adjacent angular sectors are connected to one another by their respective bends 35. The bends 35 therefore define the points of contact 57 between the elongate heating elements 25.

Each elongate heating element 25 extends to a central zone 39 located at the center of the frame 29. This central zone 39 is typically circular, and has a surface smaller than 10% of the surface delimited by the peripheral part 30.

According to another embodiment of the invention, at least some of the elongate heating elements 25 each form a first arc 37 from the peripheral part 30 toward the geometric center G. The first arc 37 is concave on a first circumferential side. In the example shown in FIGS. 4 and 5, the first arc 37 is concave in the clockwise direction.

Furthermore, at least some of the elongate heating elements 25 each form a second arc 41 from the peripheral part 30 toward the geometric center G. The second arc 41 is concave on a second circumferential side opposite the first circumferential side. In the example shown in FIGS. 4 and 5, the second arc 41 is concave in the counterclockwise direction.

The first and second arcs 37 and 41 all extend to the central zone 39.

The first arcs 37 cross the second arcs 41 at intersection points 43 and are fastened to the second arcs 41 at the intersection point 43. The intersection points 43 therefore define the points of contact 57.

The curve of the first arc 37 is always on the same side. In other words, it is never inverted. The curve radius of the first arc 37, however, decreases when one follows the first arc 37 from the peripheral part 30 of the frame toward the central zone 39.

The second arc 41 is arranged in the same way. The curve is still on the same side, and does not change. Conversely, the curve radius tends to decrease when one follows the second arc 41 from the peripheral part 30 of the frame toward the central zone 39.

The first and second arcs 37, 41 therefore have wreath shapes.

According to one example embodiment, the elongate heating elements 25 are wires. Such heating elements are shown in FIGS. 2 to 7.

In this case, they are fastened to one another by interlaced respective portions and/or by ligatures and/or by welding spots.

Figure 8:
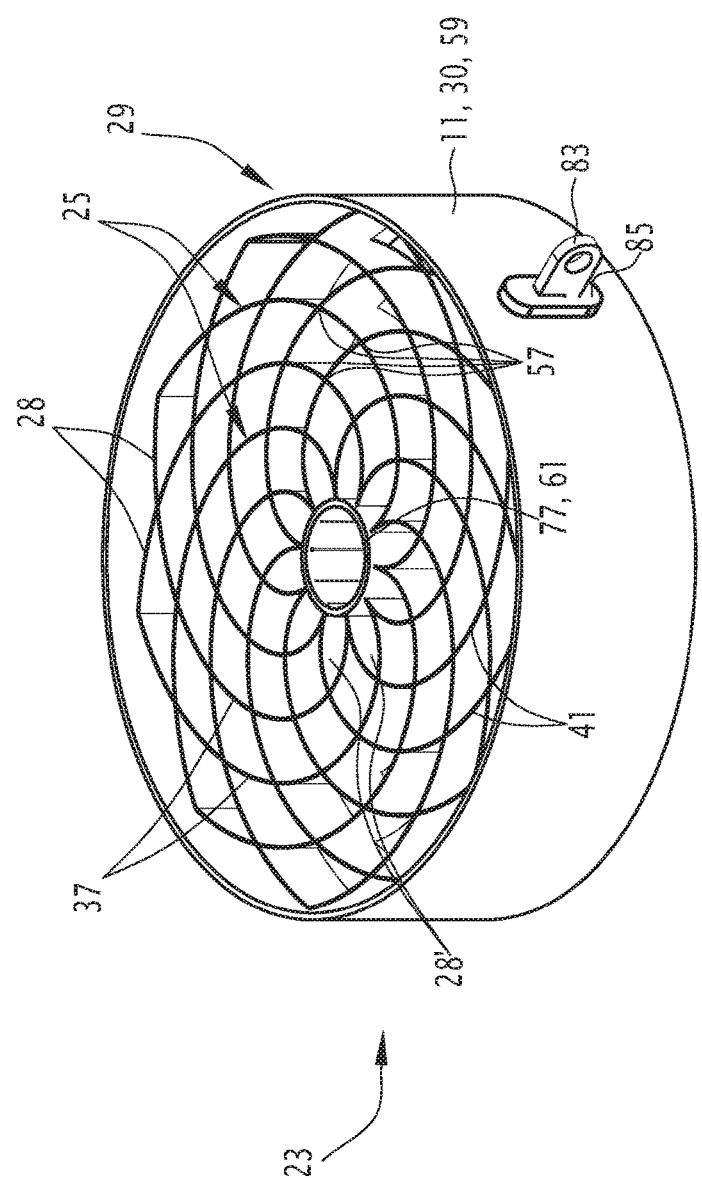
FIGS. 8 and 9 are views similar to those of FIG. 4, for still other embodiments of the heating member.

According to another example embodiment, the elongate heating elements 25 are not wires, but strips. Such heating elements are illustrated in FIG. 8. The strips are separate from one another.

These strips are arranged as described above, so as to form first and second arcs 37, 41 with opposite concave sides.

Each strip has a small thickness considered in section perpendicular to the central axis C. Conversely, each strip has a significant width in light of its thickness, considered parallel to the central axis C.

The strips are fastened to each other by respective notches nested in one another and/or by gluing and/or by welding.

Figure 9:
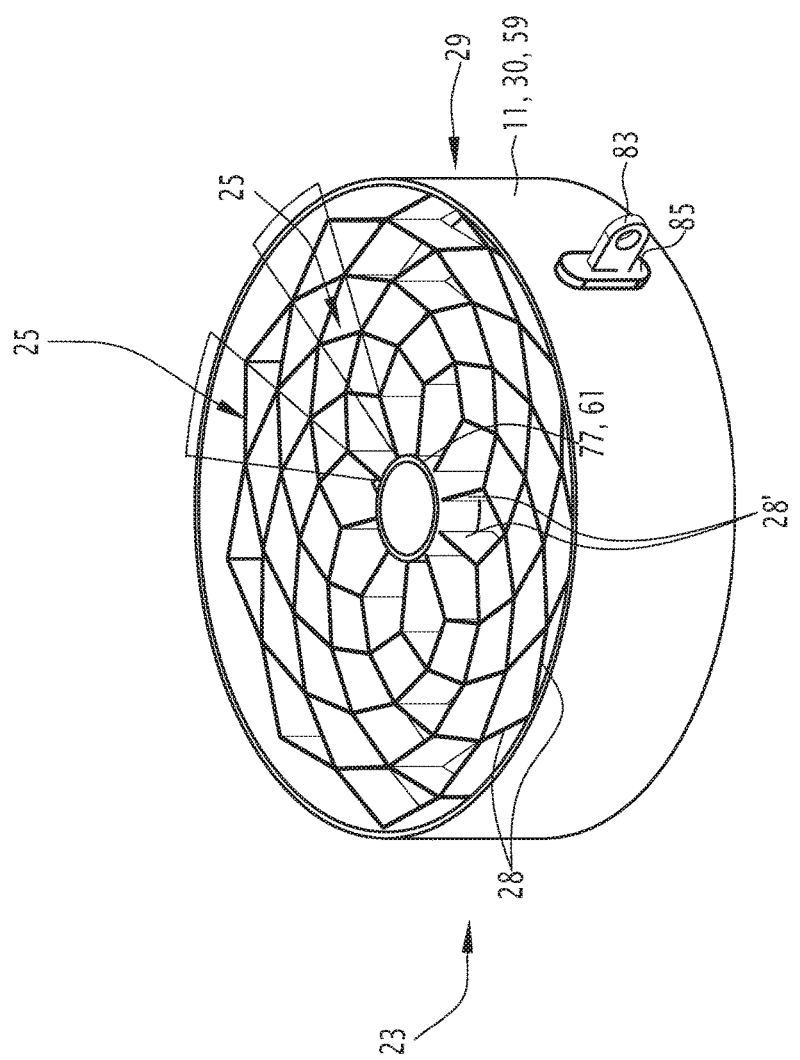

According to another embodiment, the elongate heating elements 25 are strips integral with one another, for example using an extrusion or additive manufacturing (3D printing) method. Such an embodiment is shown in FIG. 9.

The elongate heating elements 25 in this embodiment are in the form of plates, having a reduced thickness in section perpendicular to the central axis C, and a width much larger than their thickness parallel to the central axis C. These heating elements 25 are positioned in a zigzag, like in the example embodiments of FIGS. 2, 3, 6 and 7.

Figure 4:
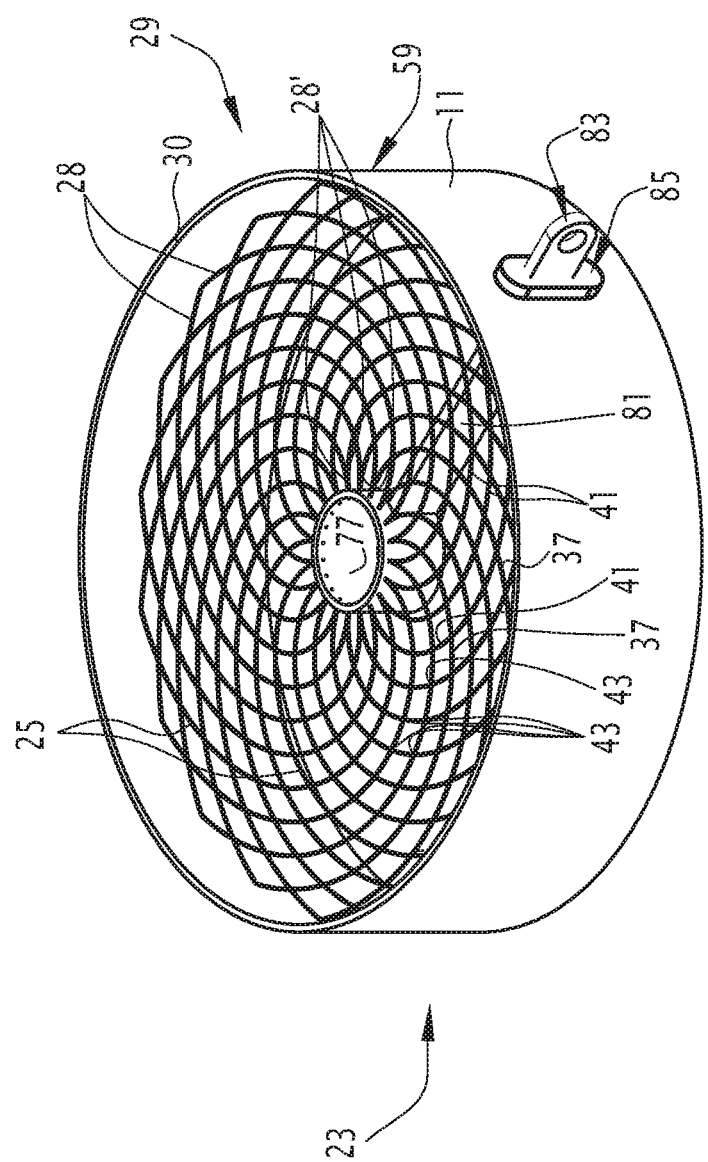
FIG. 4 is a view similar to that of FIG. 2, showing a heating member according to another embodiment.
Figure 6:
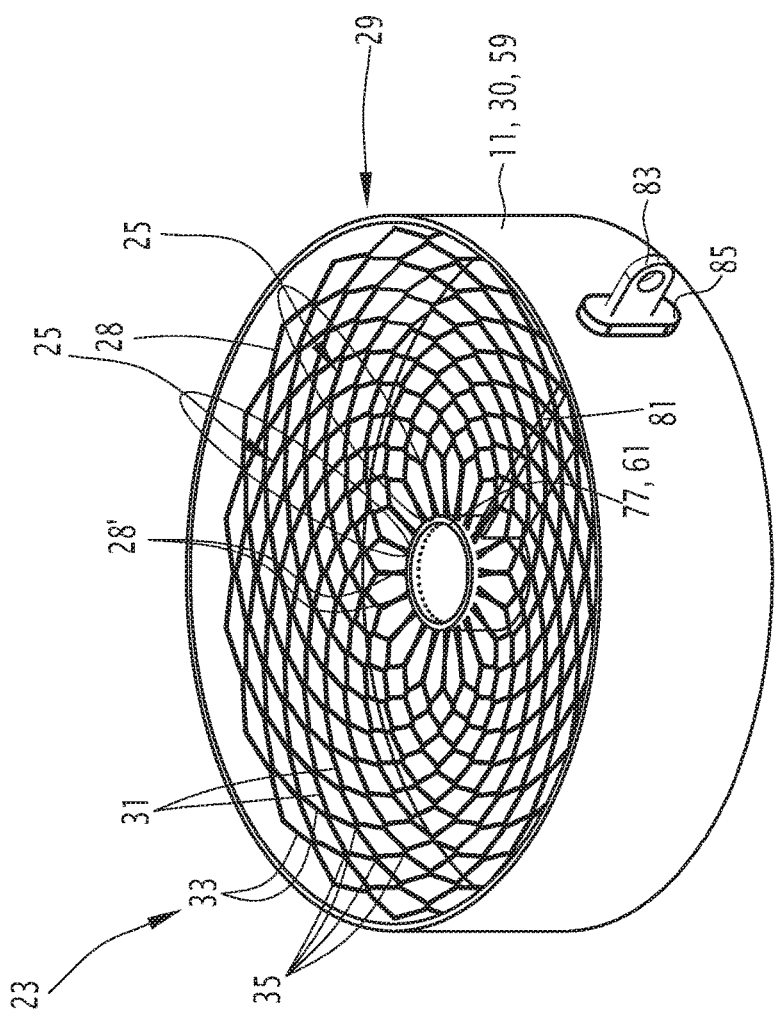
FIGS. 6 and 7 are views similar to those of FIGS. 4 and 5, for still another embodiment of the heating member.

Alternatively, the heating elements could be arranged to form first and second arcs 37, 41, like in FIGS. 4 and 6.

Such a structure is advantageously obtained by 3D printing. In this case, it is made from a metal or silicon carbide material, or any other appropriate material.

Figure 15:
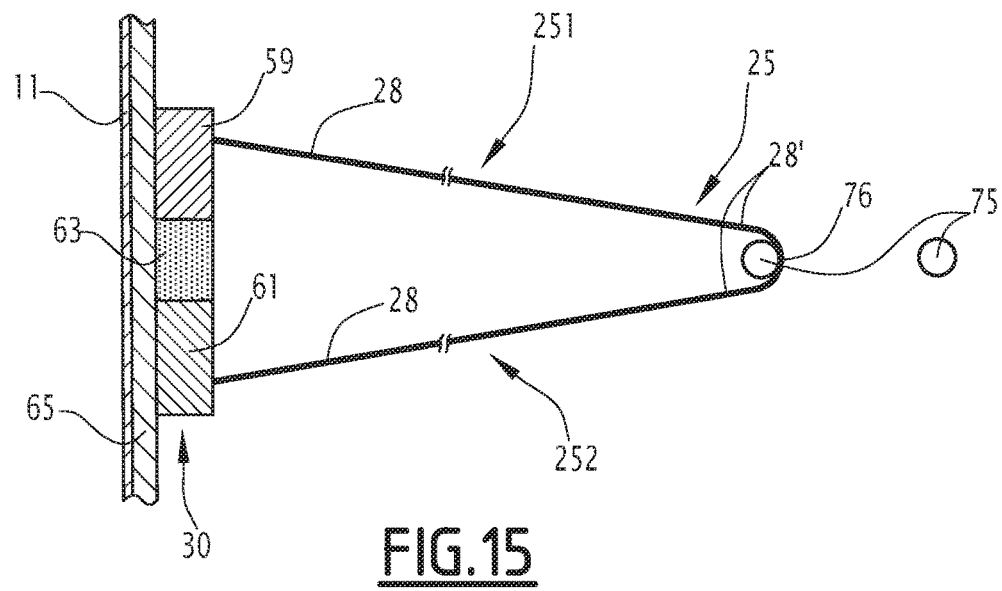
FIGS. 15 and 16 are radial sectional views showing two alternative embodiments for the arrangement of the frame of the heating element.

According to one embodiment, the heating member 23 comprises at least first and second layers 251, 252 of elongate heating elements 25 (FIGS. 2, 3 and 15).

The elongate heating elements 25 of the first layer 251 and the elongate heating elements 25 of the second layer 252 are electrically connected to one another by their respective second ends 28'.

The first ends 28 of the elongate heating elements 25 are mechanically fastened to the peripheral part 30 of the frame 29. The second ends 28' are situated in the central zone 39.

Thus, each elongate heating element 25 of the first layer 251 is connected by its second end 28' to the second end 28' of one of the elongate heating elements 25 of the second layer 252.

In other words, each pair of elongate heating elements makes a round-trip between the peripheral part 30 and the central zone 39 of the frame 29.

In this case, the peripheral part 30 of the frame 29 typically comprises a first electrical distributor 59 with a closed contour extending around elongate heating elements 25, and a second electrical distributor 61 with a closed contour, also extending around elongate heating elements 25. The elongate heating elements 25 of the first layer 251 are each electrically connected by their first end 28 to the first electrical distributor 59. The elongate heating elements 25 of the second layer 252 are each electrically connected by their first end 28 to the second electrical distributor 61.

In the illustrated example, the first and second electrical distributors 59, 61 are cylindrical rods, made from an electrically conductive metal.

At least one of the two electrical distributors 59, 61 is electrically connected to the power source 27. For example, the first electrical distributor 59 is electrically connected to the power source 27 and the second electrical distributor 61 is electrically connected to the ground. Alternatively, both electrical distributors 59, 61 are connected to two terminals of the power source 27.

Figure 12:
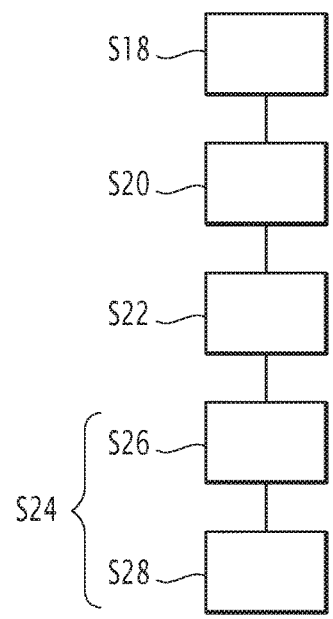

Advantageously, the first and second electric distributors 59, 61 are positioned side by side along the central axis of the frame 29, as shown in FIG. 12. They are kept separated from each other by spacers 63 made from an electrically insulating material (see FIGS. 2, 3 and 15). The first and second electrical distributors 59, 61 are kept in position and electrically insulated in the enclosure 11 by a fibrous layer 65, interposed radially between the electrical distributors and the enclosure 11. The fibrous layer 65 is similar to that keeping the purification member 5 in position.

The first and second electrical distributors 59, 61 each comprise an electrical connector, respectively referenced 67, 69, leaving the enclosure 11 through an orifice 71 arranged in the latter. These connectors make it possible to connect the electrical distributors 59, 61 to the power source 27 and optionally to the ground.

According to an alternative embodiment that is not shown, the second end 28' of each elongate heating element 25 of one of the two layers 251, 252 are connected not to a second electrical distributor, but directly to the enclosure 11. The latter is then typically connected to the ground.

It should be noted that the elongate heating elements 25 of the first layer 251 are not necessarily configured in the same pattern as the elongate heating elements 25 of the second layer 252. The pattern drawn by the elements of the first layer 251 may have the same shape, but be circumferentially offset around the geometric center G relative to the pattern drawn by the elements of the second layer 252. It may also be drawn differently.

Figure 16:
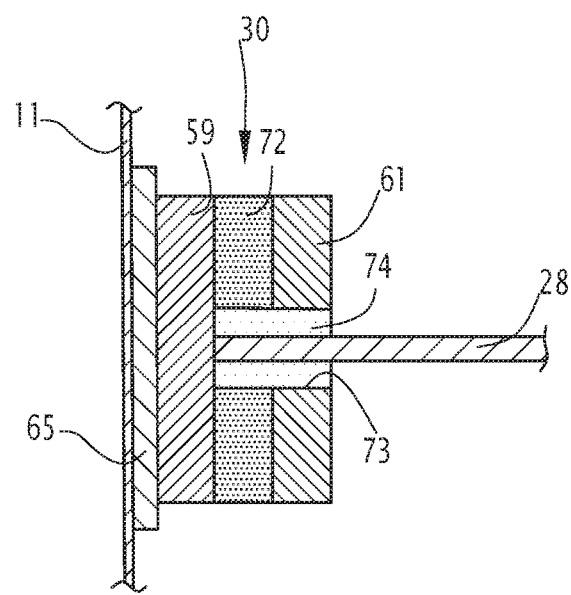

According to the alternative embodiment illustrated in FIG. 16, the first and second electric distributors 59, 61 are arranged concentrically.

One of the two distributors, here the second electric distributor 61, is placed inside the other electric distributor, here the first electric distributor 59. An insulating ring 72 is interposed between the two electric distributors 59, 61. The maintaining layer 65 is interposed between the outermost electric distributor and the enclosure 11. The inner electric distributor is pierced by orifices 73, through which the first ends 28 of the elongate heating elements 25 of the first layer 251 are connected to the outer electric distributor. An insulating ring 74, slid around the end 28, allows electrical insulation of this end of the inner electric distributor. Alternatively, the insulating ring 74 is eliminated, and the orifice 73 is large enough to allow the end 28 not to come into contact with the inner electric distributor while being kept in place by the outer electric distributor irrespective of the operating conditions.

In any case, the frame 29 comprises an annulus 75, in particular visible in FIGS. 2, 3 and 15, the second ends 28', connected to each other, forming switchbacks 76 around the annulus 75. The annulus 75 is arranged in the central zone 39.

Advantageously, the annulus 75 is circular. The annulus 75, is for example, made from an electrically conductive material, strong enough to be able to keep the elongate heating elements 25 tensed.

Thus, the frame 29 does not include a central support mechanically connected to the peripheral part 30, unlike the other embodiment described below.

According to this other embodiment, the frame 29 comprises a central support 77, each elongate heating element 25 being mechanically fastened by its first end 28 to the peripheral part 30 of the frame 29 and by its second end 28' to the central support 77. This configuration is in particular shown in FIGS. 4 to 9.

The central support 77 is placed at the center of the frame 29.

The central support 77 is, for example, in the form of a substantially cylindrical ring, with axis C. It for example has an outer section smaller than 10% of the inner section of the peripheral part 30.

In this case, the peripheral part 30 of the frame 29 only comprises the first electric distributor 59, extending around elongate conductor elements 25. The second electric distributor 61 is arranged on the central support 77. Each elongate heating element 25 is electrically connected by its first end 28 to the first electric distributor 59 and by its second end 28' to the second electric distributor 61.

Advantageously, the central support 77 constitutes the second electric distributor 61.

In one example embodiment, the peripheral part 30 of the frame 29 is made up of the enclosure 11 itself, as illustrated in FIGS. 4 to 9. The first ends 28 are therefore directly connected to the enclosure 11.

The enclosure 11 then advantageously constitutes the first electric distributor 59, to which the first ends 28 of the elongate heating elements 25 are electrically connected.

According to one alternative embodiment, the enclosure 11 constitutes the second electric distributor 61, the central support 77 constituting the first electric distributor. The first and second ends 28, 28' of the elongate heating elements 25 are then mechanically fastened respectively to the central support 77 and to the enclosure 11.

The central support 77 is mechanically fastened to the peripheral part 30 of the frame by a rigid structure 81. The rigid structure 81 is electrically insulated from the first distributor 59, and from the enclosure 11.

In the example shown in FIGS. 4 to 7, the structure 81 is an arm.

The structure 81 is typically electrically conductive, and electrically connected to the power source 27 and/or to the ground. To that end, it comprises a connector 83, which traverses the enclosure 11 through an orifice not visible in the figures. An insulating ring 85 electrically insulates the connector 83 and the structure 81 of the enclosure 11. The structure 81 is rigid enough to keep the central support 77 and the elongate heating elements 25 in position relative to the peripheral part 30.

According to one alternative embodiment, the central support 77 and/or the first electric distributor 59 and/or the second electric distributor 61 is/are integral with the elongate heating elements 25. This is particularly advantageous when the elongate heating elements 25 are integral with one another, as illustrated in FIG. 9.

The elongate heating elements 25 form a thin wafer, substantially parallel to the upstream face 7.

The frame 29 is typically fastened to the enclosure 11. Thus, neither the linear heating elements 25 nor the frame 29 are fastened directly to the purification member 5.

Figure 10:
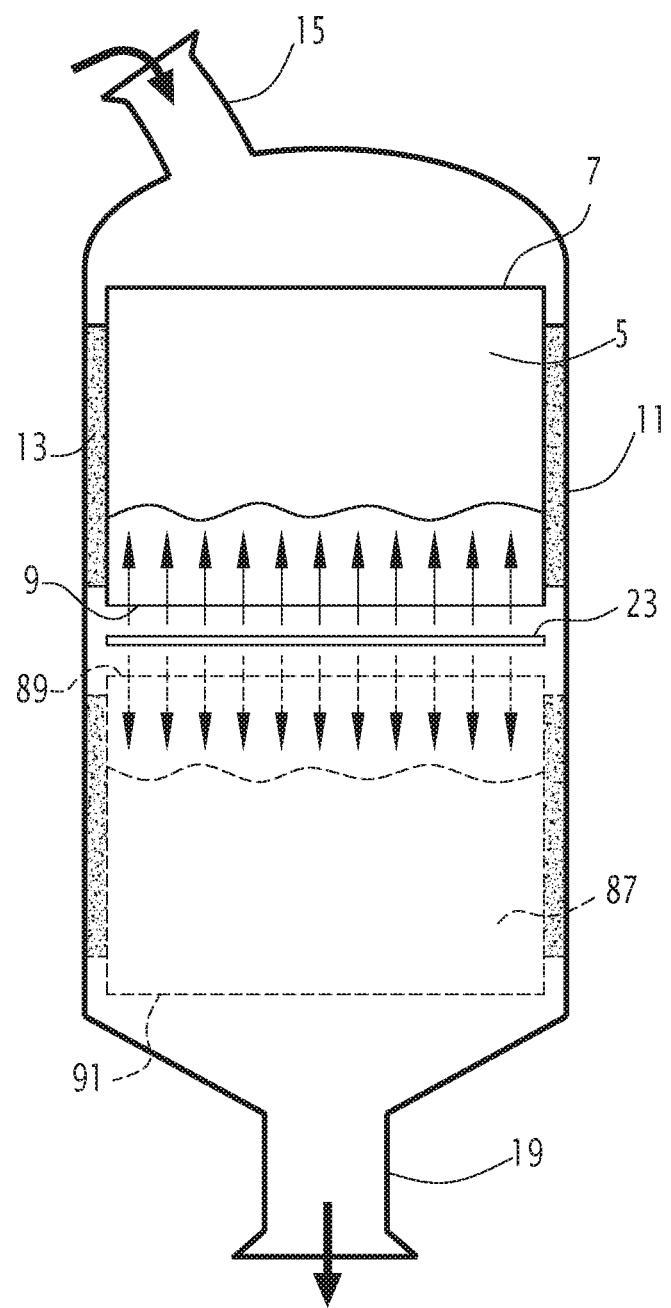
FIG. 10 is a schematic illustration showing another arrangement of the heating member in the purification device.

According to one alternative embodiment, the heating member 23 is arranged across from the downstream face 9 of the purification member 5. Such an arrangement is shown in FIG. 10.

According to another alternative embodiment, the heating member 23 is arranged between the purification member 5 and another purification member 87. The other purification member 87 is shown in broken lines in FIG. 10.

This other purification member 87 has another upstream face 89 by which the exhaust gases penetrate the other purification member 87, and another downstream face 91 by which the exhaust gases leave the other purification member 87. The two purification members 5, 87 are relatively close to one another, such that the heating member 23 is placed both across from the downstream face 9 of the purification member 5 and across from the other upstream face 89 of the other purification member 87.

The purification device 4 further comprises a controller 93 arranged to control the heating member 23 (FIG. 1).

The controller 93, for example, comprises an information processing unit formed by a processor and a memory associated with the processor. Alternatively, the controller 93 is made in the form of programmable logic components, such as FPGAs (Field-Programmable Gate Arrays) or dedicated integrated circuits, such as ASICs (Application-Specific Integrated Circuit).

The controller 93 is in particular configured to choose the voltage and the electric current that are provided by the power source 27 to the heating member 23, so as to keep the consumed heating power and/or electrical power within a predetermined range.

Typically, the controller 93 controls the heating by pulse width modulation (PWM).

The purification device 4 further includes a member for acquiring the intensity of the electric current powering the linear heating elements 25 and the voltage across the terminals of the linear heating elements 25.

This member is of any suitable type.

Typically, this acquisition member is integrated into the controller 93.

For example, this member includes a sensor 95 for measuring electric current and a sensor 97 for measuring electric voltage (FIG. 1). Alternatively, the intensity of the electric current and the electric voltage are obtained by calculation, from information recovered in the controller 93.

Figure 11:
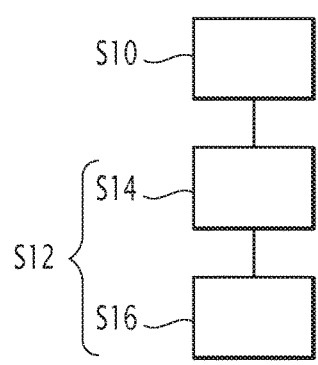
FIGS. 11 to 14 are step diagrams illustrating different methods for controlling the device according to the invention.

The controller 93 is advantageously configured to carry out a first control program, shown in FIG. 11. This program comprises the following steps:

acquiring the intensity of the electric current powering the heating member 23 and the voltage across the terminals of the heating member 23 (step S10);

determining the temperature of the elongate heating elements 25 by using the acquired current intensity and voltage (step S12).

Step S10 is carried out using the acquisition member provided to that end.

Step S12 includes a sub-step S14 for determining the electric resistance of the elongate heating elements 25.

The electric resistance is determined by obtaining the ratio between the acquired electric voltage and the acquired electric intensity, taking into account the number and the arrangement of the elongate heating elements 25.

Step S12 further includes a sub-step S16 for determining the temperature of the elongate heating elements 25 by using the electric resistance previously determined in step S14.

Indeed, the electric resistance of the elongate heating elements 25 varies as a function of the temperature of these elements. Knowing the electric resistance therefore makes it possible to deduce the temperature of the elongate heating elements 25.

Step S12 is carried out by the controller 35, using any appropriate method, such as curves, tabulations, or determined mathematical formulas, said curves, tabulations or mathematical formulas being recorded in the memory of the controller 93.

This program is typically carried out while the heating member 23 is operating, and heats the purification member 5 to its nominal power.

Additionally or in place of the first control program above, the controller 93 is configured to carry out a second control program comprising the following steps, shown in FIG. 12:

supplying electricity to the heating member 23 (step S18);

acquiring the intensity of the electric current powering the heating member 23 and the electric voltage across the terminals of the heating member 23, when the heating member 23 is at a known predetermined temperature (step S20);

evaluating the resistance of the elongate heating elements 25 by using the acquired current intensity and voltage (step 22);

detecting any damage of the elongate heating elements 25 by using the evaluated resistance (step S24).

This program is typically carried out before the vehicle is started, when the engine is cold. The device is then at ambient temperature. This ambient temperature is measured by a temperature probe of the vehicle, or can be recovered by the controller 93 in the computer 99 on board the vehicle (FIG. 1).

Advantageously, one acquires the intensity and voltage under conditions where the heating member does not generate heat, or generates a practically negligible quantity of heat.

For example, during step S18, the heating member 23 is electrically supplied with an electrical power below 10% of a rated operating electrical power of the device, preferably less than 5% of the rated power, still more preferably less than 1% of the rated electrical power. Alternatively, the heating member 23 is electrically powered at a high power, but the intensity and the voltage are acquired just after starting up the electrical power supply, in the initial several milliseconds.

In step S20, the intensity of the current and the electric voltage across the terminals of the heating member 23 are acquired as described above, for example by using the sensors 95 and 97 or by directly calculating the current and voltage from properties available in the controller 93.

In step S22, the electric resistance of the elongate heating elements 25 is evaluated by obtaining the ratio between the voltage and intensity previously acquired, taking into account the number and arrangement of the elongate heating elements 25.

Step S24 comprises a sub-step S26 for comparing the previously evaluated electrical resistance with a theoretical electrical resistance of the elongate heating elements 25. The theoretical resistance is a predetermined value for the considered determined temperature, stored in the memory of the controller 93, or modeled by the controller 93 based on operating parameters.

Preferably, the considered determined temperature is low, typically below 40° C.

During the comparison sub-step S26, the difference is, for example, obtained between the evaluated resistance and the theoretical resistance, or the ratio between the evaluated resistance and the theoretical resistance.

Step S24 further includes a diagnostic sub-step S28 relative to any damage of the elongate heating elements 25. If the previously evaluated resistance deviates too much from the theoretical resistance, it is concluded that one or several elongate heating elements 25 are damaged. On the contrary, if the evaluated resistance and the theoretical resistance are close to each other, it is concluded that the elongate heating elements 25 are not damaged. For example, a difference between the evaluated resistance and the theoretical resistance greater than 10% of the value of the theoretical resistance for the considered temperature will be considered to mean that one or several elongate heating elements 25 are damaged. Similarly, a ratio between the evaluated resistance and the theoretical resistance small than 0.9 or greater than 1.1 will be considered to mean that one or several elongate heating elements 25 are damaged.

Steps S22 and S24 are typically calculation steps, carried out by the controller 93.

Figure 13:
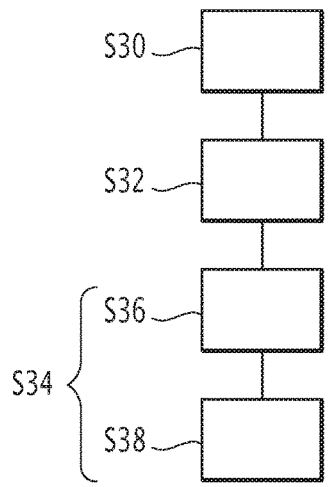

In addition to or in place of the control programs described above, the controller 93 is advantageously configured to carry out a third control program that will be described below, and which is shown schematically by FIG. 13.

This program comprises at least the following steps:
supplying electricity to the heating member 23 (step S30);
acquiring the intensity of the electric current powering the heating member 23, under conditions where the heating member 23 generates a negligible quantity of heat (step S32);
determining the temperature of the exhaust gases by using the acquired current intensity and voltage (step S34).

Typically, the present program aims to determine the temperature of the exhaust gases when the heating member 23 is no longer used to heat the purification member 5, but exhaust gases are circulating through the purification device 4. This is in particular the case when the purification device 4 reaches its minimum operating temperature, and the exhaust gases suffice to keep the purification device hot.

For example, during step S30, the heating member 23 is electrically supplied with an electrical power below 10% of a rated operating electrical power of the device, preferably less than 5% of the rated power, still more preferably less than 1% of the rated electrical power.

In step S32, the intensity of the current and the electric voltage across the terminals of the heating member 23 are acquired as described above, for example by using the sensors 95 and 97 or by directly calculating the current and voltage from properties available in the controller 93.

Step S34 includes a sub-step S36 during which the electric resistance of the elongate heating elements 25 is evaluated, typically by obtaining the ratio between the acquired voltage and intensity, taking into account the number and arrangement of the elongate heating elements 25.

Step S34 further includes a sub-step S38 during which the temperature of the elongate heating elements 25 is evaluated as a function of the resistance previously calculated. This temperature is evaluated as described above, for mathematical formulas, curves or tabulations available in the memory of the controller 93.

The temperature thus evaluated corresponds to the temperature of the exhaust gases, because the heating member 23 generates a zero or negligible quantity of heat.

Figure 14:
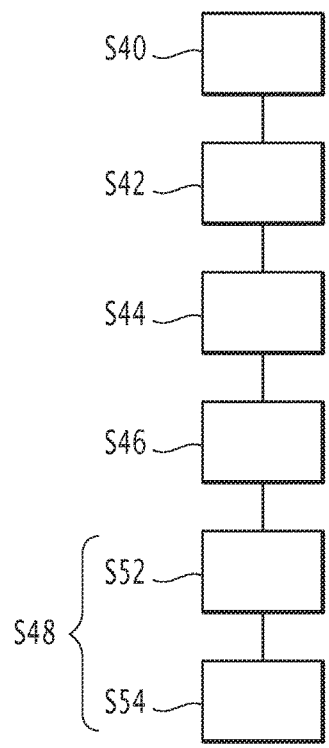

In addition to or in place of one of the programs described above, the controller 93 is advantageously configured to carry out a fourth control program, shown in FIG. 14.

The program comprises the following steps:
supplying electricity to the heating member 23 (step S40);
acquiring the intensity of the electric current powering the heating member 23 and the voltage across the terminals of the heating member 23 (step S42);
determining the temperature of the elongate heating elements 25 by using the acquired current intensity and voltage (step S44);
determining a theoretical temperature of the elongate heating elements 25, which would be reached without the circulation of the exhaust gases (step S46);
determining the exhaust gas flow rate using the temperature of the elongate heating elements 25 previously determined and the theoretical temperature of the elongate heating elements previously determined (step S48).

Thus, the program makes it possible to determine the exhaust gas flow rate through the purification member 4, once the heating member 23 is no longer used to heat the purification member 5. This is normally the case when the purification device reaches its minimum operating temperature, and the heat provided by the exhaust gases is sufficient to maintain its temperature. This program is carried out while the engine is operating and exhaust gases are flowing through the purification member 4.

Steps S40, S42 and S44 are similar to steps S30, S32 and S34.

The heating member 23 is supplied with an electrical power chosen to be strong enough to elevate the temperature of the elongate heating elements 25 slightly, which is therefore slightly higher than the temperature of the exhaust gases.

In step S46, the determined theoretical temperature corresponds to the theoretical temperature that the elongate heating elements 25 should have with no flow of exhaust gases, in light of the electrical power powering the heating member 23.

Step S46 is carried out using mathematical formulas, curves or tables stored in the memory of the controller 93.

In step S48, the exhaust gas flow rate is determined by calculation, by taking an energy balance at the elongate heating elements 25. Indeed, the difference between the theoretical temperature and the temperature previously determined is essentially explained by the heat energy ceded to the exhaust gases by each elongate heating element 25, essentially by convection. The quantity of energy ceded depends both on the weight flow rate of exhaust gases and the temperature of the exhaust gases. Step S48 thus includes a sub-step S52 for acquiring the temperature of the exhaust gases and a sub-step S54 for determining the exhaust gas flow rate as a function of the temperature of the elongate heating elements 25 previously determined in step S44, and the theoretical temperature of the elongate heating elements 25 determined in step S46.

In the sub-step S52, the temperature of the exhaust gases is acquired directly by a temperature sensor 101 equipping the exhaust line (FIG. 1) or is recovered in the on board computer 99 of the vehicle.

Sub-step S54 is carried out by calculation or using tables or curves stored in the memory of the controller 93.

The invention claimed is:

1. A device for purifying exhaust gases from a vehicle, the device comprising:
   at least one exhaust gas purification member having an upstream face by which the exhaust gases penetrate the purification member and a downstream face by which the exhaust gases leave the purification member;
   a power source;
   a heating member placed in front of and at a distance from the upstream face or the downstream face, the heating member comprising a frame and a plurality of elongate heating elements forming at least one heating layer permeable to the exhaust gases, the frame comprising a peripheral part surrounding the elongate heating elements and having a geometric center, each elongate heating element having first and second ends opposite one another, at least one of the first and second ends being electrically connected to a terminal of the power source;
   at least one of the first and second ends being connected to the frame, and each elongate heating element being, between the first and second ends, connected only to at least one other of the elongate heating elements; and
   wherein the elongate heating elements are in contact with one another by respective points of contact, two points of contact of two different elongate heating elements in contact with one another being at the same electric potential, and the elongate heating elements having no electrically insulating coating.

2. The device according to claim 1, wherein the elongate heating elements are arranged in a pattern that repeats circumferentially around the geometric center and all of the points of contact are arranged on a plurality of isopotential lines, with a closed contour, substantially centered on the geometric center, all of the points of contact at the same electrical potential being placed on a same isopotential line.

3. The device according to claim 1, wherein each elongate heating element is arranged in a zigzag and alternately forms first and second segments connected by elbows, the first segments extending radially from the peripheral part toward the geometric center and circumferentially around geometric center along a first direction, the second segments extending radially from the peripheral part toward the geometric center and circumferentially around the geometric center along a second direction opposite the first direction.

4. The device according to claim 1, wherein the elongate heating elements are wires or strips assembled to one another by any appropriate method, or strips integral with one another.

5. The device according to claim 1, wherein the elongate heating elements are heated to a temperature comprised between 150 and 1300° C. and are made from a material chosen from among FeCrAl and its alloys, NiCr and its alloys, stainless steel, inconel or silicon carbide.

6. The device according to claim 1, comprising at least first and second layers of elongate heating elements, each elongate heating element being rigidly fastened by the first end to the peripheral part, the elongate heating elements of the first layer and the elongate heating elements of the second layer being electrically connected to one another by respective second ends, second ends being situated in a central zone of the frame, and wherein the peripheral part of the frame comprises a first electric distributor extending around the elongate heating elements, and a second electric distributor extending around the elongate heating elements, the elongate heating elements of the first layer being electrically connected by respective first ends to the first electric distributor, the elongate heating elements of the second layer being electrically connected by respective first ends to the second electric distributor.

7. The device according to claim 6, wherein the first and second electric distributors are positioned side by side along a central axis of the frame, or concentrically, and are electrically isolated from one another.

8. The device according to claim 1, wherein the device comprises an enclosure inside which the exhaust gas purification member is placed, the enclosure constituting an electric distributor to which the first or second ends of the elongate heating elements are electrically connected.

9. The device according to claim 1, wherein each elongate heating element is, between the first and second ends, directly connected only to at least one other of the elongate heating elements.

10. A device for purifying exhaust gases from a vehicle, the device comprising:
    at least one exhaust gas purification member having an upstream face by which the exhaust gases penetrate the purification member and a downstream face by which the exhaust gases leave the purification member;
    a power source;
    a heating member placed in front of and at a distance from the upstream face or the downstream face, the heating member comprising a frame and a plurality of elongate heating elements forming at least one heating layer permeable to the exhaust gases, the frame comprising a peripheral part surrounding the elongate heating elements and having a geometric center, each elongate heating element having first and second ends opposite one another, at least one of the first and second ends being electrically connected to a terminal of the power source;

at least one of the first and second ends being connected to the frame, and each elongate heating element being, between the first and second ends, connected only to at least one other of the elongate heating elements; and wherein the elongate heating elements are in contact with one another by respective points of contact, two points of contact of two different elongate heating elements in contact with one another being at the same electric potential; and wherein the frame further includes a central support placed at the center of the frame and mechanically connected to the peripheral part, each elongate heating element being mechanically connected by the first end to the peripheral part and by the second end to the central support, the peripheral part including a first electric distributor and the central support includes a second electric distributor, each elongate heating element being electrically connected by the first end to the first electric distributor and by the second end to the second electric distributor.

11. The device according to the claim 10, wherein the central support and/or the electric distributor is/are integral with the elongate heating elements.

12. A device for purifying exhaust gases from a vehicle, the device comprising:

at least one exhaust gas purification member having an upstream face by which the exhaust gases penetrate the purification member and a downstream face by which the exhaust gases leave the purification member;

a power source;

a heating member placed in front of and at a distance from the upstream face or the downstream face, the heating member comprising a frame and a plurality of elongate heating elements forming at least one heating layer permeable to the exhaust gases, the frame comprising a peripheral part surrounding the elongate heating elements and having a geometric center, each elongate heating element having first and second ends opposite one another, at least one of the first and second ends being electrically connected to a terminal of the power source;

at least one of the first and second ends being connected to the frame, and each elongate heating element being, between the first and second ends, connected only to at least one other of the elongate heating elements; and wherein the elongate heating elements are in contact with one another by respective points of contact, two points of contact of two different elongate heating elements in contact with one another being at the same electric potential, wherein the elongate heating elements are wires or strips assembled to one another by any appropriate method, or strips integral with one another, wherein each elongate heating element is, between the first and second ends, directly connected only to at least one other of the elongate heating elements.

13. The device according to claim 1, wherein at least one of the first and second ends is directly connected to the frame.

14. The device according to claim 12, wherein at least one of the first and second ends is directly connected to the frame.

* * * * *